(12) United States Patent
Kadowaki et al.

(10) Patent No.: US 7,382,509 B2
(45) Date of Patent: Jun. 3, 2008

(54) POLYGON MIRROR SCANNER DEVICE WITH TUBULAR MAGNET ADHERED TO THE INSIDE OF THE TUBULAR MIRROR WITH A DEPRESSION ON THE INNER FACE, OPPOSITE THE MIRROR FACE, WITH A GAP, ABSENT ADHESIVE, FORMED BETWEEN THE MAGNET AND INNER FACE

(75) Inventors: Noriyuki Kadowaki, Shibata-gun (JP);
Hidetoshi Kojima, Shibata-gun (JP);
Yoshihiro Takahashi, Shibata-gun (JP)

(73) Assignee: Tohoku Ricoh Co., Ltd., Shibata-gun (JP)

( * ) Notice: Subject to any disclaimer, the term of this patent is extended or adjusted under 35 U.S.C. 154(b) by 85 days.

(21) Appl. No.: 11/505,365

(22) Filed: Aug. 17, 2006

(65) Prior Publication Data

US 2007/0047045 A1    Mar. 1, 2007

(30) Foreign Application Priority Data

Aug. 31, 2005    (JP)    ............................. 2005-252290

(51) Int. Cl.
G02B 26/08    (2006.01)

(52) U.S. Cl. ..................................... 359/216

(58) Field of Classification Search ................ 359/216, 359/196, 197, 212, 218, 219, 855
See application file for complete search history.

(56) References Cited

U.S. PATENT DOCUMENTS 4,607,908 A * 8/1986 Ishida et al. ................ 359/200
5,138,477 A * 8/1992 Omura et al. ............... 359/200
5,420,713 A * 5/1995 Kunii ......................... 359/198
5,969,844 A * 10/1999 Itami et al. ................. 359/200
6,661,550 B2 * 12/2003 Konno et al. ............... 359/200
2002/0085294 A1* 7/2002 Kurosawa ................... 359/871
2003/0002123 A1* 1/2003 Worner et al. .............. 359/216
2004/0246552 A1* 12/2004 Matsui et al. ............... 359/216

FOREIGN PATENT DOCUMENTS

JP    62075129 A   *   4/1987
JP    05100178 A   *   4/1993

* cited by examiner

Primary Examiner—Stephone B. Allen
Assistant Examiner—Jennifer L Doak
(74) Attorney, Agent, or Firm—Oblon, Spivak, McClelland, Maier & Neustadt, P.C.

(57) ABSTRACT

Disclosed is a polygon mirror scanner device, used as a rotor, having a plurality of mirror faces on the outer peripheral face of a mirror member having a substantially tubular shape, with a tubular magnet adhered to the lower inner peripheral face of the mirror member. A depression is uniformly formed in the circumferential direction on the inner peripheral face, at a position opposite the mirror faces, such that a gap forms between the magnet and the inner peripheral face when the magnet is at a predetermined positioned. An adhesive agent is provided at the upper end and lower end of the magnet, but not in the gap. When the mirror faces are two-tiered, the upper end of the magnet is located at substantially an intermediate position in the height direction of the two-tier mirror faces.

7 Claims, 4 Drawing Sheets

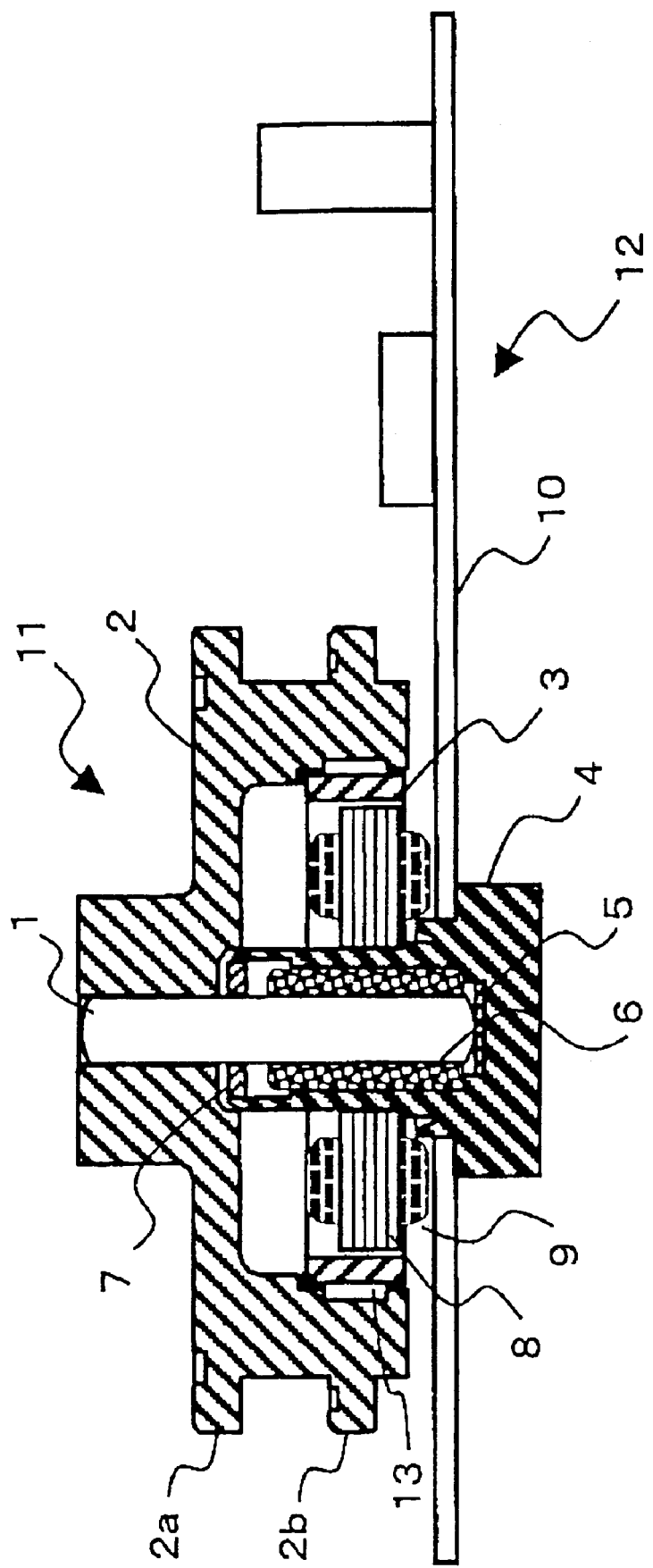

POLYGON MIRROR SCANNER DEVICE WITH TUBULAR MAGNET ADHERED TO THE INSIDE OF THE TUBULAR MIRROR WITH A DEPRESSION ON THE INNER FACE, OPPOSITE THE MIRROR FACE, WITH A GAP, ABSENT ADHESIVE, FORMED BETWEEN THE MAGNET AND INNER FACE

BACKGROUND OF THE INVENTION

1. Field of the Invention

The present invention relates to an image forming device such as a copier machine, printer, fax machine or the like, and more particularly, to a rotating device and polygon mirror scanner device that can be used as an optical deflector of an image capture device employed in such an image forming device.

2. Description of the Background Art

As explained below, when a magnet is adhered to a mirror member as a rotating body of such conventional polygon mirror scanner devices the mirror faces become strained by the contraction forces of the adhesive agent as it cures, giving rise to a problem of impaired planarity of the mirror faces. Some techniques for solving this problem have been disclosed, for instance, in Japanese Patent Application Laid-open No. 2001-166249, Japanese Patent Application Laid-open No. 2001-228432 and Japanese Patent Application Laid-open No. H06-43383

However, these technologies have not fully solved the above problems.

SUMMARY OF THE INVENTION

An object of the present invention is to provide a polygon mirror scanner device that allows preventing mirror face strain caused by contraction forces upon curing of an adhesive agent with which a magnet is adhered to a mirror member as a rotating body used in a polygon mirror scanner.

In accordance with the present invention, there is provided a polygon mirror scanner device as a rotor in which a tubular-shaped magnet is adhered via an adhesive agent to the lower inner peripheral face of a tubular mirror member having a plurality of outer mirror faces, and having an opening in one side and a rotating shaft pressed in the other side, wherein a depression wider than the thickness of the mirror faces is uniformly formed in the circumferential direction along the inner peripheral face, at a position opposite the mirror faces, and wherein a gap not filled with the adhesive agent is formed between the magnet and the inner peripheral face.

Further, in accordance with the present invention, there is provided an image forming device using a polygon mirror scanner device as a rotor in which a tubular-shaped magnet is adhered via an adhesive agent to the lower inner peripheral face of a tubular mirror member having a plurality of outer mirror faces, and having an opening in one side and a rotating shaft pressed in the other side, wherein a depression wider than the thickness of the mirror faces is uniformly formed in the circumferential direction along the inner peripheral face, at a position opposite the mirror faces, and wherein a gap not filled with the adhesive agent is formed between the magnet and the inner peripheral face.

Still further, in accordance with the present invention, there is provided an image capture device using a polygon mirror scanner device as a rotor in which a tubular-shaped magnet is adhered via an adhesive agent to the lower inner peripheral face of a tubular mirror member having a plural-ity of outer mirror faces, and having an opening in one side and a rotating shaft pressed in the other side, wherein a depression wider than the thickness of the mirror faces is uniformly formed in the circumferential direction along the inner peripheral face, at a position opposite the mirror faces, and wherein a gap not filled with the adhesive agent is formed between the magnet and the inner peripheral face.

BRIEF DESCRIPTION OF THE DRAWINGS

The above and other objects, features and advantages of the present invention will become more apparent from the following detailed description taken with the accompanying drawings in which:

FIG. 2 is a cross-sectional diagram illustrating the constitution of a polygon mirror scanner device according to an embodiment of the present invention;

DESCRIPTION OF THE PREFERRED EMBODIMENTS

The conventional technology and the problems thereof will be described first, with reference to accompanying drawings, before proceeding to explain the present invention.

Figure 1A:
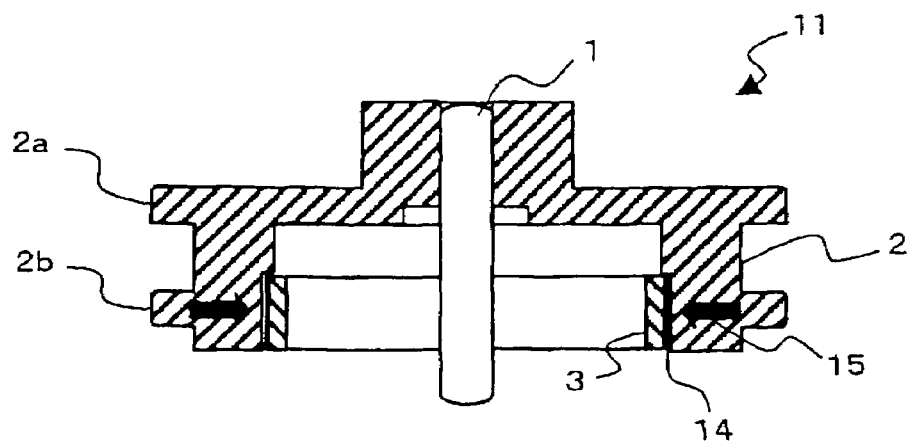
FIG. 1A is cross-sectional diagram illustrating the constitution of a conventional polygon mirror scanner device.
Figure 1B:
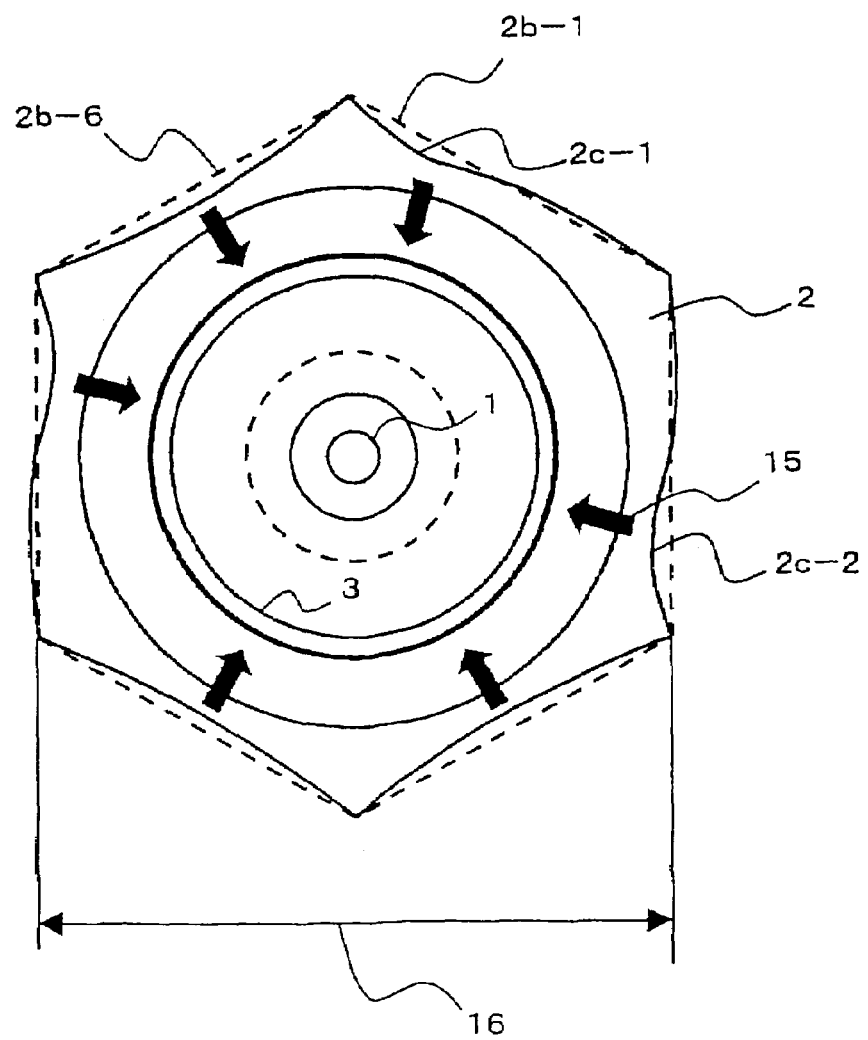
FIG. 1B is a rear-view diagram illustrating the constitution of the conventional polygon mirror scanner device.

FIGS. 1A and 1B illustrate the constitution of a conventional polygon mirror scanner device. In the figures, the reference numeral 1 denotes a rotating shaft, 2 a mirror member, 3 a magnet, 11 a rotor, 14 an adhesive agent, 15 the direction of curing contraction forces, and 16 an opposite-side distance of the mirror faces.

As illustrated in FIG. 1A, the mirror member 2 has a substantially tubular shape, one end of the mirror member 2 having an opening, a rotating shaft being pressed into the center portion of the other end of the mirror member 2 (see, for instance, Japanese Patent Application Laid-open No. 2001-166249).

The rotor 11 is constituted in such a way that the outer periphery of the mirror member 2 has, for instance, six mirror faces 2a (2a-1 through 2a-6) and 2b (2b-1 through 2b-6), while on the inner peripheral side of the mirror member 2 is adhered a magnet 3, somewhat removed from the lower face in the height direction. Thus, the curing contraction of the adhesive agent 14 causes forces to act in the directions denoted by the arrows 15, deforming the mirror faces 2b and impairing the planarity thereof. Optical characteristics deteriorate as a result (through jittering, beam diameter changes), affecting the output image. For instance, as the extent of the opposite-side distance 16 of the mirror faces approaches that of the outer diameter of the magnet 3, the mirror faces 2b become partially or totally deformed, as indicated by the reference numerals 2c, thereby greatly impairing the planarity of the mirror faces 2b.

Designing a smaller magnet 3 in order to circumvent this problem makes it more difficult to achieve the necessary magnetic characteristics. In this context, Japanese Patent Application Laid-open No. 2001-228432 discloses also placing the magnet 3 under the mirror member 2, but this increases the height of the rotor 11, which makes it difficult to slim the profile of a writing unit. Defective work costs are incurred, moreover, as a result of defective products caused by deformation of the mirror faces 2b.

Japanese Patent Application Laid-open No. 2001-228432 discloses also a method for preventing mirror faces strain during assembly. However, this method provides a means for preventing stress deformation when a rotating shaft is pressed into a mirror member, and hence bears no relationship with curing contraction forces of the adhesive agent.

On the other hand, Japanese Patent Application Laid-open No. H06-43383 discloses a technology in which gaps are provided at positions opposite the mirror faces. In such a scheme, the upper and lower faces of a single mirror are flanked by another two members, with an adhesive agent interposed between the contact faces, while at the positions opposite the mirror faces are formed gaps not in close contact with the above two members. An adhesive agent is interposed also therein so that the above two faces are joined to each other. That is, these gaps are a means for preventing mirror strain by avoiding dynamic imbalances during high-speed rotation, but do not take into account contraction forces upon adhesive agent curing.

An embodiment of the polygon mirror scanner device of the present invention is described next with reference to FIGS. 2, 3A & 3B.

In the figures, the reference numeral 4 denotes a bearing housing, 5 a thrust bearing, 6 an oil-retaining bearing, 7 a seal washer, 8 a core, 9 a coil, 10 a control board and 13 a gap. The rest of the reference numerals are based on FIGS. 1A & 1B.

The basic constitution of the present embodiment is identical to those illustrated in FIGS. 1A & 1B, and will be explained taking these as an example. Therefore, the size of the magnet 3 is not particularly different from that of conventional technology. The difference vis-à-vis conventional art is the adhesion position of the magnet 3. The relative position of the magnet 3 and the mirror member 2 is identical to that in the conventional case, but herein the magnet 3 and the inner peripheral face of the mirror member 2 do not come into contact over the entire surface thereof, but only a the upper and lower ends.

That is, a depression wider than the thickness of the mirror faces 2b is uniformly formed along the entire circumference of the of the inner peripheral face of the mirror member 2, at a position opposite the mirror faces 2b, such that a gap 13 forms when the magnet 3 is mounted. The adhesive agent 14 is applied only to the contact portions, without coming into the gap 13. Therefore, the adhesive agent 14 is divided into a section 14a for adhesion to the upper end face of the magnet 3 and to the outer peripheral face in the vicinity of the upper end, including the upper end, of the magnet 3, and a section 14b for adhesion to the outer peripheral face of the magnet 3 in the vicinity of the lower end thereof, including the lower end.

Figure 3A:
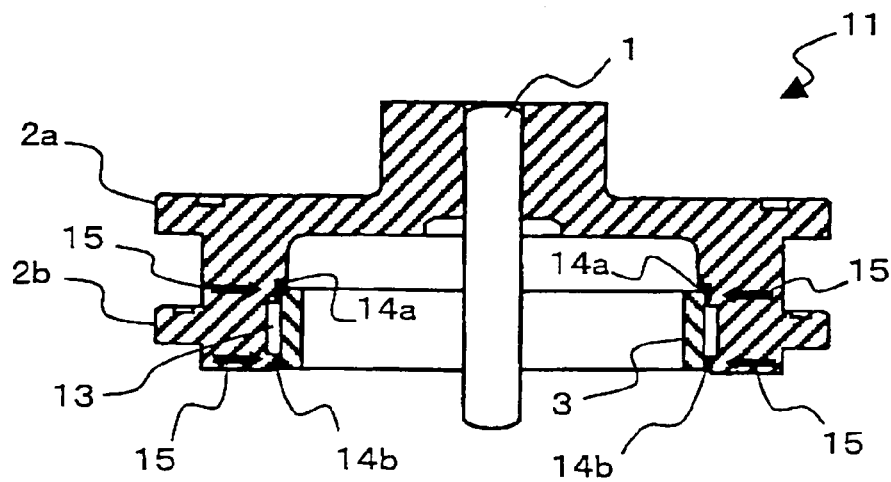
FIG. 3A is a cross-sectional diagram illustrating the constitution of a rotor in the polygon mirror scanner device.
Figure 3B:
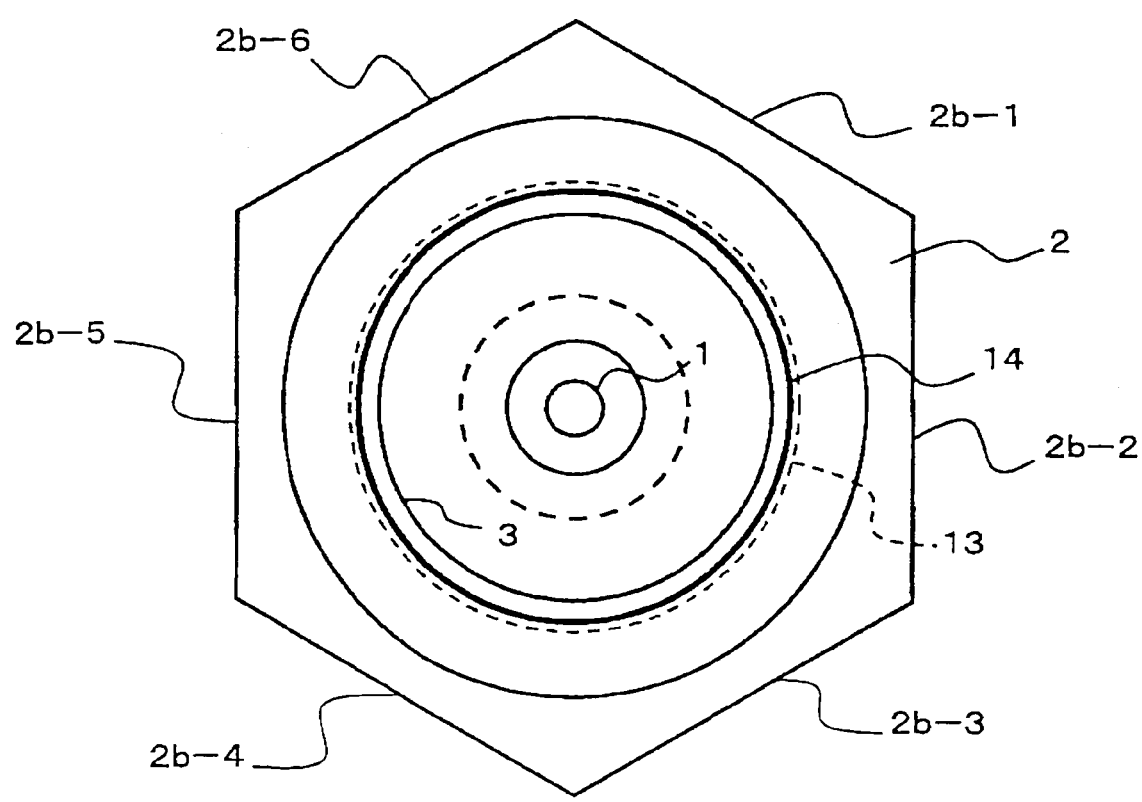
FIG. 3B is a rear-view diagram of the rotor.

Even with an adhered magnet 3, thus, the contraction forces after curing of the adhesive agent 14 in such an adhesion scheme act only at positions corresponding to the adhesion portions, as indicated by the arrows 15 of FIG. 3A, so that stresses do not act directly on the mirror faces 2b. Herein, "contact" refers to a state in which enough space is left to allow interposing the adhesive agent.

In the present embodiment, therefore, the mirror faces do not become strained, even when the magnet 3 is adhered, thereby preventing image quality impairment.

A drop in adhesive strength is not a concern in the present example, since the adhesion position extends uniformly along the upper and lower ends of the entire perimeter of the magnet 3, in the circumferential direction. Also, the magnet 3 is not adhered over the entire height thereof, but at the upper and lower ends, which reduces and disperses curing contraction forces, reducing thus also the strain on the mirror member 2 brought about by the curing contraction forces. As a result, no deformation of the mirror faces 2b affects image quality, even when the extent of the opposite-side distance 16 of the mirror faces further approaches that of the outer diameter of the magnet 3.

The magnet 3 can be formed to a size identical to that of conventional art, and can be arranged in the height direction at a position overlapping with the mirror member 2, thereby preventing an increase in rotor height.

The position of the mirror faces 2b and the gap 13 relative to each other in the height direction may be such the mirror faces 2b and the gap 13 are symmetrical with respect to the height of a height center point of the magnet 3. The contraction forces upon curing of the adhesive agent 14 act then symmetrically relative to the mirror faces 2b, so that any curing contraction forces acting at all on the mirror faces 2b will not cause the mirror faces 2b to slant.

Curing contraction forces can be further reduced using an elastic adhesive agent, such as a silicone adhesive agent or the like, as the adhesive agent 14.

Figure 4:
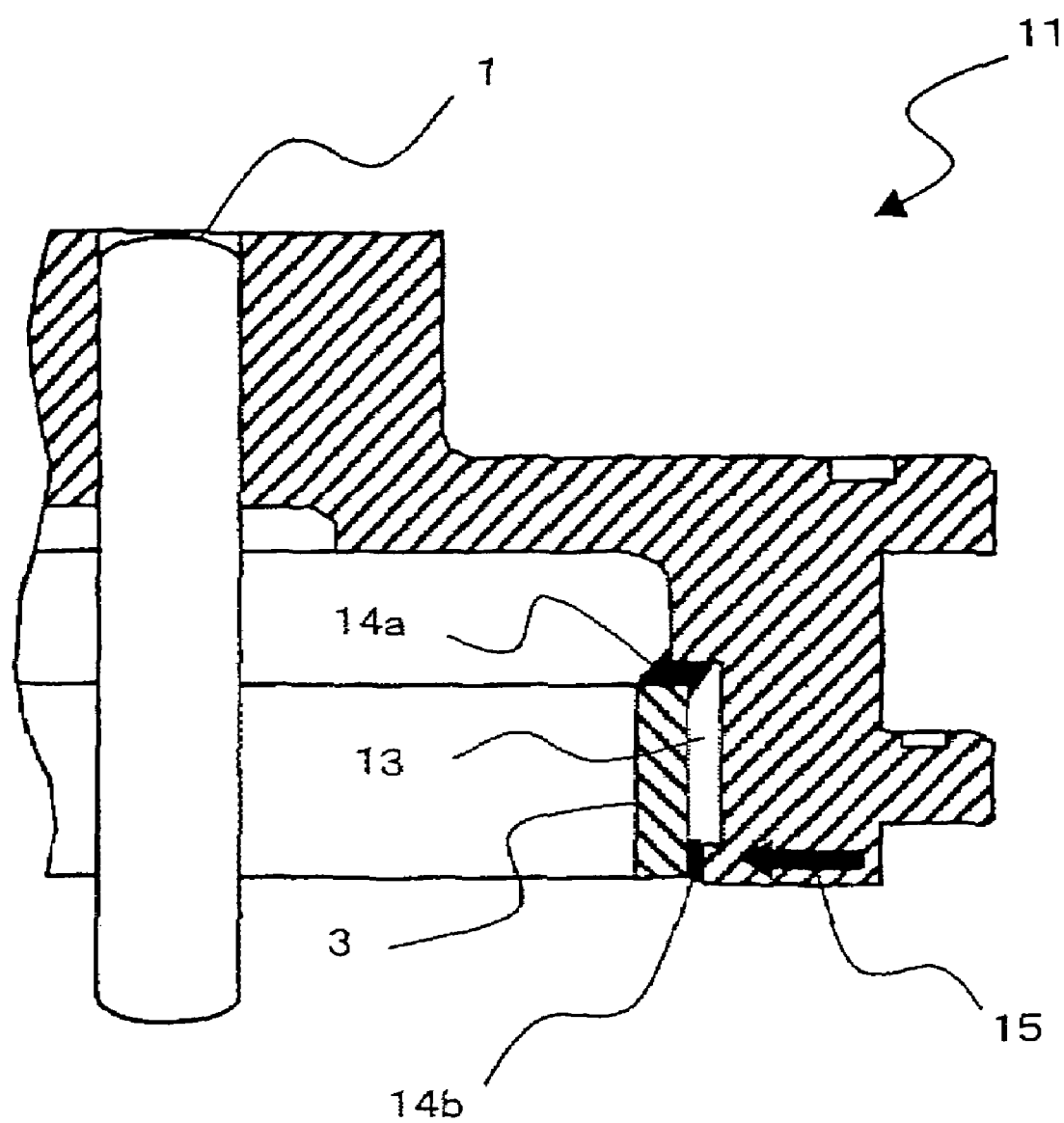
FIG. 4 is cross-sectional diagram illustrating a partial constitution in a modification of the rotor.

FIG. 4 illustrates the constitution of the rotor in a modification of the present embodiment.

In the above embodiment, the outer peripheral face and the upper end face in the upper end of the magnet 3 were in contact with the mirror member 2, but in the present modification only the upper end face of the magnet 3 is in contact with the mirror member 2. The depression of the mirror member 2 becomes then wider by the extent of that portion. The adhesive agent 14a adheres only to the upper end face of the magnet 3, and hence the curing contraction forces of the adhesive agent 14a act only in the vertical direction of FIG. 4, pulling up the magnet 3 in the vertical direction, so that no stresses are generated that could deform the mirror faces 2b. In FIG. 4 is shown some adhesive agent adhering also to the outer peripheral face of the upper end of the magnet 3, but this corresponds merely to a portion of adhesive agent sticking out and becoming adhered thereto as a result. Accordingly, the curing contraction forces acting on the rotor 11 are contraction forces 15 generated only in the vicinity of the lower end of the rotor 11, and which exert virtually no negative influence on the mirror faces.

In the present modification, the shape of the inner peripheral face of the mirror member 2 involves one shoulder less, which simplifies machining operations, thereby reducing costs.

In the present invention, thus, the deformation of mirror faces caused by curing contraction forces of the adhesive agent are extremely small even when the magnet is adhered at the height of the mirror member, making it possible thereby to preserve initial surface precision.

Various modifications will become possible for those skilled in the art after receiving the teachings of the present disclosure without departing from the scope thereof.

What is claimed is:

1. A polygon mirror scanner device, as a rotor, in which a tubular-shaped magnet is adhered via an adhesive agent to the lower inner peripheral face of a tubular mirror member having a plurality of outer mirror faces, and having an opening in one side and a rotating shaft pressed in the other side, wherein a depression wider than the thickness of said mirror faces is uniformly formed in the circumferential direction along said inner peripheral face, at a position opposite said mirror faces, and wherein a gap not filled with said adhesive agent is formed between said magnet and said inner peripheral face.

2. The polygon mirror scanner device according to claim 1, wherein the adhesion position of the tubular magnet to said inner face is a position not opposite said mirror faces.

3. The polygon mirror scanner device according to claim 1, wherein said plurality of mirror faces are formed in two tiers, and the adhesion position of the tubular magnet to said inner face in the height direction corresponds to substantially an intermediate position of said two-tier mirror faces and an end face position of said rotor.

4. The polygon mirror scanner device according to claim 1, wherein the position at which the adhesive agent attaches to said tubular magnet is the upper end face of said magnet and the outer peripheral face in the vicinity of the lower end, including the lower end, of said magnet.

5. The polygon mirror scanner device according to claim 1, wherein an elastic adhesive agent is used as said adhesive agent.

6. An image forming device using a polygon mirror scanner device, as a rotor, in which a tubular-shaped magnet is adhered via an adhesive agent to the lower inner peripheral face of a tubular mirror member having a plurality of outer mirror faces, and having an opening in one side and a rotating shaft pressed in the other side, wherein a depression wider than the thickness of said mirror faces is uniformly formed in the circumferential direction along said inner peripheral face, at a position opposite said mirror faces, and wherein a gap not filled with said adhesive agent is formed between said magnet and said inner peripheral face.

7. An image capture device using a polygon mirror scanner device, as a rotor, in which a tubular-shaped magnet is adhered via an adhesive agent to the lower inner peripheral face of a tubular mirror member having a plurality of outer mirror faces, and having an opening in one side and a rotating shaft pressed in the other side, wherein a depression wider than the thickness of said mirror faces is uniformly formed in the circumferential direction along said inner peripheral face, at a position opposite said mirror faces, and wherein a gap not filled with said adhesive agent is formed between said magnet and said inner peripheral face.

* * * * *